US 6,690,753 B2

(12) United States Patent
Kwon et al.

(10) Patent No.: US 6,690,753 B2
(45) Date of Patent: Feb. 10, 2004

(54) RECEIVER HAVING DECISIONAL FEEDBACK EQUALIZER WITH REMODULATION AND RELATED METHODS

(75) Inventors: Thomas D. Kwon, Milpitas, CA (US); Jonathan S. Min, Buena Park, CA (US); Fang Lu, Irvine, CA (US); Thomas J. Kolze, Phoenix, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/163,871

(22) Filed: Jun. 7, 2002

(65) Prior Publication Data

US 2003/0002602 A1 Jan. 2, 2003

Related U.S. Application Data

(60) Provisional application No. 60/296,457, filed on Jun. 8, 2001.

(51) Int. Cl.[7] .................................................. H04L 1/00
(52) U.S. Cl. ....................... 375/344; 375/350; 375/348
(58) Field of Search .................................. 375/324, 326, 375/344, 348, 350, 233

(56) References Cited

U.S. PATENT DOCUMENTS

| 5,150,380 A | 9/1992 | Okanoue |
| 5,499,268 A | 3/1996 | Takahashi |
| 6,115,433 A | 9/2000 | de Lantremange |
| 6,347,126 B1 | 2/2002 | Nagayasu et al. |

OTHER PUBLICATIONS

International Search Report issued Dec. 12, 2002 for Appln. No. PCT/US02/17890, 4 pages.

Primary Examiner—Amanda T. Le
(74) Attorney, Agent, or Firm—Sterne, Kessler, Goldstein & Fox P.L.L.C.

(57) ABSTRACT

A receiver includes a filter for filtering a received signal to produce a filtered signal. A converter converts the filtered signal to a baseband signal that is substantially free of an initial frequency offset and inter-symbol interference (ISI), responsive to a frequency-offset estimate and a restorative signal that compensates for the ISI. A detector detects symbols in the baseband signal to produce a decision signal. A restorative signal generator generates, from the decision signal, the restorative signal responsive to the frequency-offset estimate, such that the restorative signal compensates for the ISI.

27 Claims, 10 Drawing Sheets

RECEIVER HAVING DECISIONAL FEEDBACK EQUALIZER WITH REMODULATION AND RELATED METHODS

CROSS-REFERENCE TO RELATED APPLICATIONS

This application claims priority to U.S. Provisional Application No. 60/296,457, filed Jun. 8, 2001, entitled "Generalized DFE Architecture with Remodulation," incorporated herein by reference in its entirety.

BACKGROUND OF THE INVENTION

1. Field of the Invention

The present invention relates generally to receivers, and more particularly, to a receiver with equalization.

2. Related Art

A conventional receiver includes multiple receiver components, some of which may be used to overcome signal impairments. Some of the components may implement a carrier tracking loop. The carrier tracking loop tracks differences between transmit and receive carrier frequencies and/or phases. Because a carrier tracking loop having a short loop delay is usually considered to have better performance than a loop with a long loop delay, it can be beneficial to close the loop closer to an end of the receiver. However, this arrangement can result in an undesirable interaction between the tracking loop and other receiver components. Thus, the arrangement can disadvantageously reduce the effectiveness and/or adaptability of some or all of these other receiver components. This may disadvantageously increase receiver acquisition time and reduce receiver Signal-to-Noise ratio (SNR) performance. There is a need therefore for a receiver arrangement that overcomes these disadvantages.

SUMMARY OF THE INVENTION

An embodiment of the present invention is a receiver including a filter stage including one or more adaptive and/or static pre-filters, a carrier loop, and an equalization loop. The equalization loop includes an adaptive equalizer. The present invention decouples an interaction between the carrier loop, the pre-filters, and the equalizer using a technique referred to as "remodulation." The architecture of the present invention is more stable and significantly faster than conventional architectures. For example, the present invention improves receiver acquisition time and SNR performance compared to conventional receivers.

An embodiment of the present invention is a receiver for processing a received signal, the received signal includes symbols and a frequency offset from baseband. The receiver includes a carrier tracking loop for generating an estimate of the frequency offset. The receive includes a filter stage for filtering the received signal to produce a filtered signal, whereby the filter introduces inter-symbol interference (ISI) in the filtered signal. A converter converts the filtered signal to a baseband signal that is substantially free of the frequency offset and the ISI, responsive to the frequency-offset estimate and a restorative signal that compensates for the ISI. A detector detects the symbols in the baseband signal to produce a decision signal. A restorative signal generator generates, from the decision signal, the restorative signal responsive to the frequency-offset estimate, such that the restorative signal compensates for the ISI. The restorative signal generator is referred to as a decisional feedback equalizer (DFE) with remodulation. Further embodiments of the present invention are described below.

BRIEF DESCRIPTION OF THE FIGURES

The present invention is described with reference to the accompanying drawings. In the drawings, like reference numbers indicate identical or functionally similar elements.

DETAILED DESCRIPTION OF THE PREFERRED EMBODIMENTS

Figure 1:
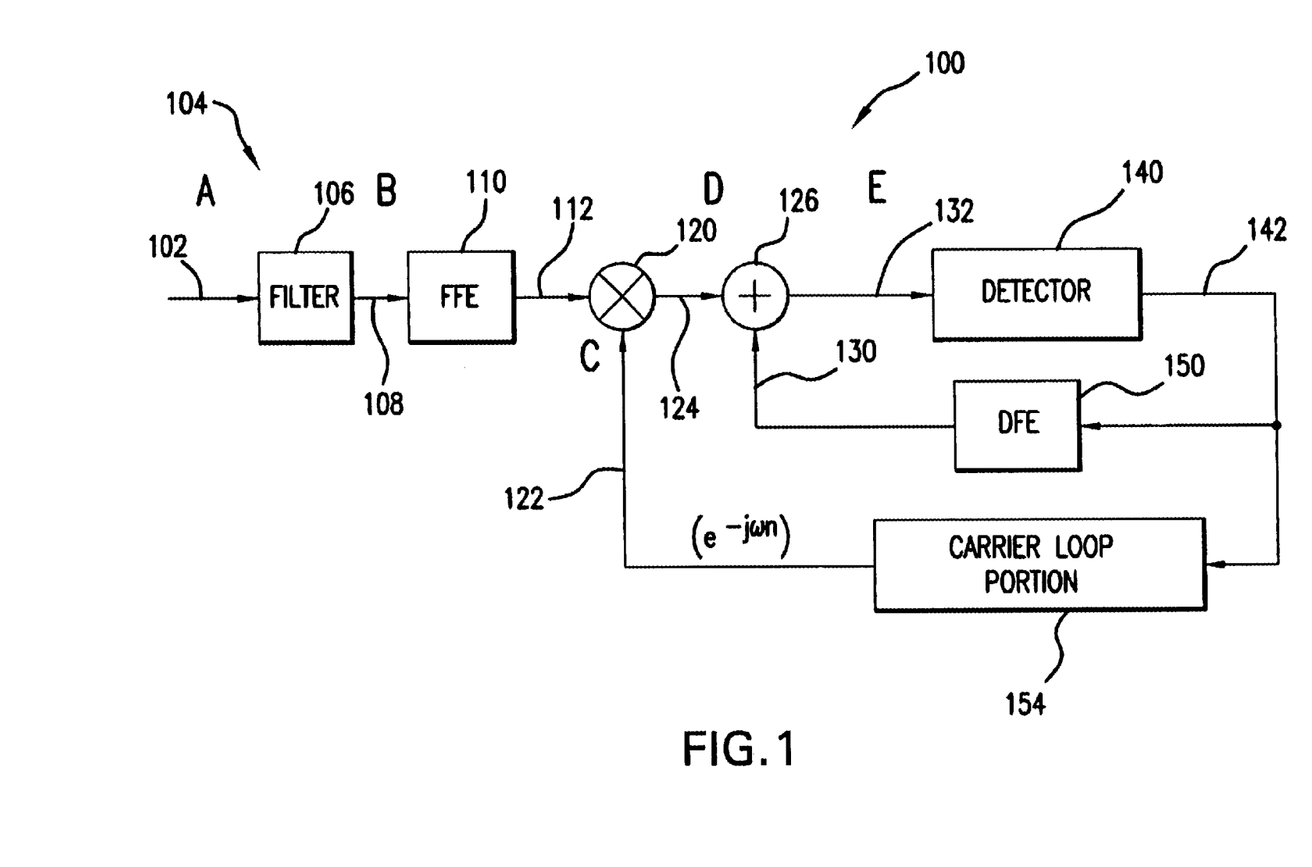
FIG. 1 is an example receiver with a carrier tracking loop and a decisional feedback equalizer loop.

FIG. 1 is an example receiver 100. Receiver 100 processes a received signal 102. In an exemplary arrangement, signal 102 includes data packets spaced apart in time from each other, and referred to as data bursts. Each of the data packets includes a series of Quadrature Amplitude Modulated (QAM) symbols to be demodulated by receiver 100. Signal 102 may relate to a multiple user cable television (CATV) broadband communication system, for example. Typically, signal 102 includes an undesired frequency offset (and/or phase offset) representative of a difference in frequency (and/or phase) between a reference oscillator in a transmitter that originated signal 102 (not shown) and a reference oscillator associated with receiver 100 (depicted in FIG. 8, for example).

Also, signal 102 may include interference, such as ingress, to be reduced by receiver 100. Receiver 100 includes a filter stage 104. In filter stage 104, a pre-filter 106 filters signal 102 so as to reduce the above-mentioned interference, and produces a filtered signal 108. For example, filter 106 may be an adaptive notch filter that notches-out a relatively narrowband interferer. Also in filter stage 104, an equalizer 110, such as a feed-forward equalizer (FFE), equalizes signal 108 to produce a filtered, equalized signal 112 (also referred to as a filtered signal 112). Typically, filter 106 corrupts the frequency spectrum of signal 102, thus causing substantial ISI in filtered signals 108 and 112. Filter stage 104 may include more or less filters than are depicted in FIG. 1, and different types of filters from those described above.

A multiplier 120 (which may be a frequency mixer) frequency-shifts filtered signal 112 toward baseband by an amount approximately equal to the undesired frequency offset, responsive to a frequency correction signal 122. In an example arrangement, baseband corresponds to zero "0" Hz. Multiplier 120 produces an intermediate signal 124 at or near baseband, that is, substantially free of the frequency offset, but that includes the ISI. A combiner 126, such as a signal adder, combines intermediate signal 124 with a restorative signal 130 that is intended to compensate for the ISI. Thus, combiner 126 produces a baseband signal 132 that is substantially free of the undesired frequency offset and some of the ISI. Often, much of the ISI disadvantageously remains in baseband signal 132, as will be illustrated below.

A detector 140, also referred to as a "slicer" 140, detects, for example, makes decisions on, the symbols in baseband signal 132. Detector 140 produces a baseband decision signal 142 including the detected symbols. A DFE 150 generates the restorative signal 130 based on decision signal 142. DFE 150 operates as a filter equalizer that filters an input signal (in this case, decision signal 142) based on filter coefficients, also referred to as weighting coefficients.

A carrier loop portion 154 estimates the frequency offset, that is, generates a frequency-offset estimate co representative of the undesired frequency offset, based at least in part on decision signal 142. Carrier loop portion 154 generates correction signal 122 such that it has a frequency equal to frequency-offset estimate co. For example, carrier loop portion 154 may generate correction signal 122 as a series of samples of a complex sinusoidal signal represented by the term $e^{-j\omega n}$, where n is a time index indicating the $n^{th}$ sample of signal 122. Alternatively, signal 122 may be a continuous-time signal represented by the term $e^{-j\omega t}$, where t represents time.

Carrier loop portion 154 forms part of a carrier tracking loop (also referred to herein as a carrier loop) of receiver 100, including multiplier 120, combiner 126, detector 140 and carrier loop portion 154. The carrier loop tracks and corrects for the undesired frequency offset. Specifically, multiplier 120 frequency-shifts filtered signal 112 toward baseband by an amount equal to frequency ω of correction signal 122. Thus, multiplier 120 frequency-shifts filtered signal 112 toward baseband based on, that is, responsive to, frequency-offset estimate ω.

Receiver 100 also includes a decisional feedback equalizing (or equalizer) loop including combiner 126, detector 140, and DFE 150. The decisional feedback equalizing loop attempts to correct for the ISI mentioned above.

In receiver 100, the above-mentioned carrier loop corrects, that is substantially removes, the frequency offset prior to DFE 150 (and the DFE loop). An appropriate choice of architecture and filter coefficients for filter 106 and DFE 150 allows DFE 150 to nearly perfectly compensate for the inter-symbol interference (ISI) introduced by filter 106 in the absence of a frequency offset. However, receiver 100 exhibits several deficiencies in the presence of the frequency offset. Although the carrier loop can correct the frequency offset, the DFE coefficients must be recalculated every time the carrier loop modulates the incoming spectrum with frequency correction signal 122. Significant time is required whether the DFE is adaptive, or the DFE coefficients are predetermined, for example, calculated off-line. Moreover, the DFE coefficients cannot be recalculated until the carrier loop has acquired frequency lock to within an acceptable degree of accuracy. In some cases, an interaction between the DFE and the carrier loop can lead to receiver instability. This is unacceptable for systems requiring speedy acquisition, such as when receiver 100 is to acquire data bursts associated with signal 102.

Figure 2:
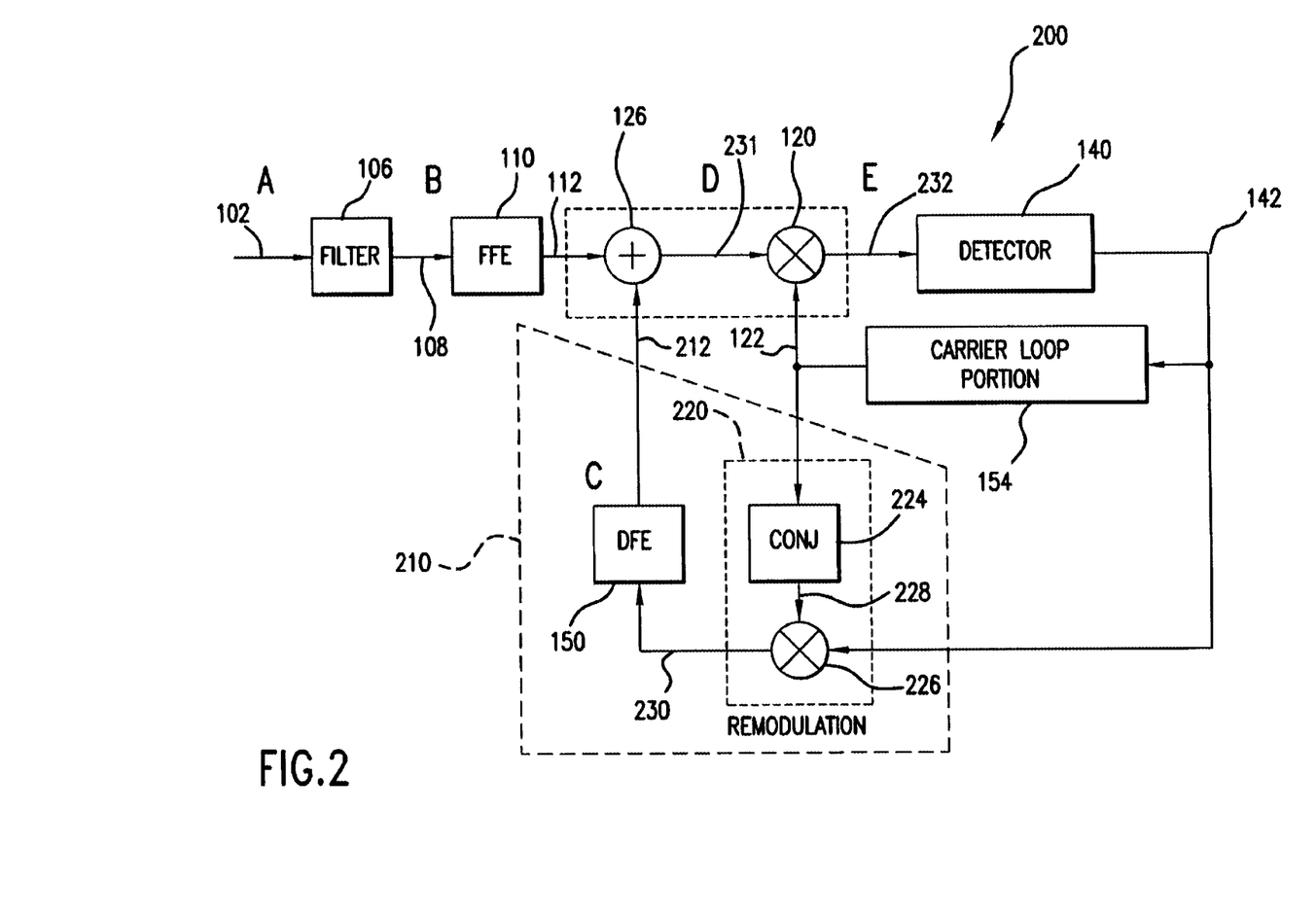
FIG. 2 is a block diagram of an example receiver with improvements over the receiver of FIG. 1.

FIG. 2 is a block diagram of an example receiver 200 with improvements over receiver 100. Receiver 200 includes a restorative signal generator 210 for generating, from decision signal 142, a restorative signal 212 responsive to frequency-offset estimate ω, and more specifically, responsive to frequency correction signal 122. Restorative signal generator 210 includes DFE 150 coupled to a remodulator 220. Thus, restorative signal generator is referred to as a decisional feedback equalizer with remodulation.

Remodulator 220 includes a conjugate transformer 224 coupled to a multiplier 226. Transformer 224 transforms frequency correction signal 122 (for example, $e^{-j\omega n}$) to a transformed frequency correction signal 228 that is a complex conjugate of frequency correction signal 122 (for example, $e^{+j\omega n}$). Multiplier 226 frequency-shifts decision signal 142 away from baseband responsive to frequency-offset estimate ω, and more specifically, responsive to transformed frequency correction signal 228, thereby producing a frequency-shifted decision signal 230. The process of multiplying decision signal 142 by frequency correction signal 122 is referred to as remodulation. Remodulation modulates, that is, adjusts the frequency and phase of decision signal 142 in correspondence with the frequency and phase of frequency correction signal 122.

DFE 150 filters frequency-shifted decision signal 230 to produce restorative signal 212. In an arrangement of receiver 200, filter 106 and DFE 150 use the same filter coefficients, which may be either adaptive or static.

Restorative signal 212 is frequency-shifted away from baseband in correspondence with (that is, by an amount equal to) frequency-shifted decision signal 230. In other words, restorative signal 212 is frequency-shifted away from baseband by an amount equal to frequency-offset estimate ω).

In receiver 200, the order of multiplier 120 and combiner 126 is reversed with respect to the order in receiver 100. That is, combiner 126 precedes multiplier 120. In receiver 200, combiner 126 combines filtered signal 112 with restorative signal 212 to produce an intermediate signal 231 substantially free of ISI, but having the frequency offset present in input signal 102. Multiplier 120 frequency-shifts intermediate signal 231 toward baseband responsive to frequency-offset estimate ω, and more specifically, responsive to frequency correction signal 122, thereby producing a baseband signal 232. Baseband signal 232 is substantially free of both the frequency offset and the ISI.

In receiver 200, a decisional feedback loop with remodulation, including components 126, 120, 140 and 210, compensates for the ISI introduced by filter 106. The carrier loop, including components 120, 140 and 154, is internal to the decisional feedback loop with remodulation. This arrangement separates the decisional feedback equalizing, and DFE 150, from the frequency-shifting action of the carrier loop. This arrangement also requires the remodulation to maintain compatibility between DFE 150 and filter 106. Essentially, the remodulation temporarily undoes the effects of the carrier loop, while DFE 150 operates.

Figure 3:
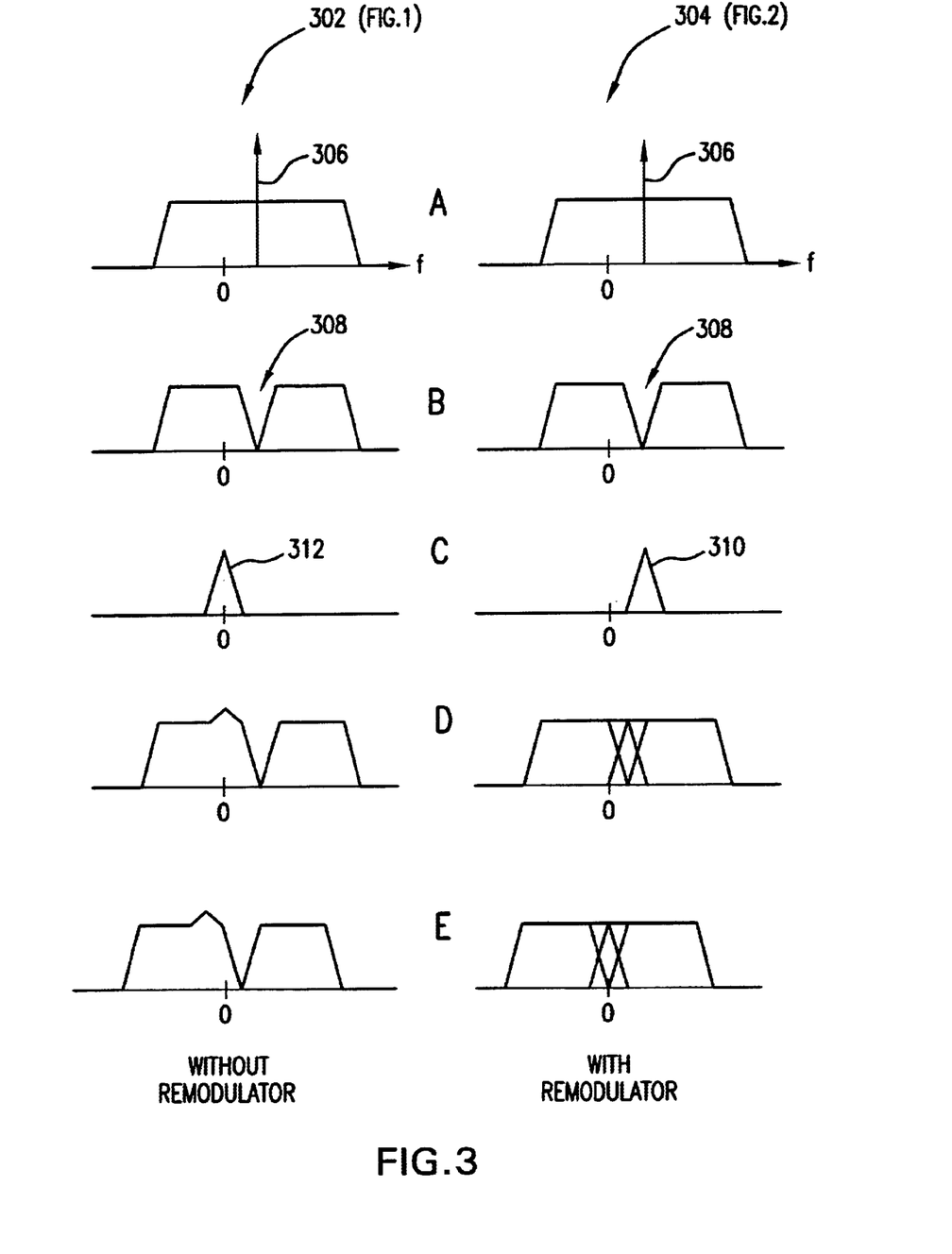
FIG. 3 is an illustration of example signal spectra corresponding to various points of signal flow in the receiver of FIG. 2.

The operation of receiver 200 is explained further with reference to FIG. 3. FIG. 3 is an illustration of example signal spectra corresponding to various points of signal flow A through E identified in FIGS. 1 and 2. In FIG. 3, there is depicted a first column 302 of example signal frequency spectra (on the left hand side of FIG. 3) and a second column 304 of example signal frequency spectra (on the right hand side of FIG. 3). Spectra 304 correspond to receiver 200, which includes remodulator 210. Spectra 302 correspond to receiver 100, which does not include a remodulator. For convenience, it is assumed that equalizer 110 is configured so as to not introduce changes to the frequency spectrum of signal 102 beyond those changes introduced by filter 106. It is also assumed that filter 106 is a notch filter, although other types of filters may be used with the present invention.

Traversing FIG. 3 from top-to-bottom, signal 102 has a frequency spectrum, represented at A, including an undesired frequency offset and ingress interference or interferer 306. Ingress 306 is represented as a tone interferer having a frequency coinciding with a center frequency of the spectrum of signal 102. The undesired frequency offset of signal 102 causes the spectrum of signal 102 to be shifted slightly to the right of baseband.

Filter 106 cancels interferer 306, thus producing signal 108. Signal 108 has a spectrum, represented at B, including a frequency notch 308 caused by filter 106 and coinciding-in-frequency with interferer 306. In the time domain, frequency notch 308 causes substantial ISI in signals 108 and 112.

In receiver 200, restorative signal generator 210, with remodulator 220, generates restorative signal 212. Signal 212 has a spectrum represented at C in column 304. Spectrum C, of restorative signal 212, includes a restorative frequency-correction spectrum 310 shifted away from baseband by an amount ω causing frequency correction spectrum 310 to coincide-in-frequency with notch 308 of spectrum B. In contrast, in receiver 100, restorative signal 130 has a frequency-correction spectrum 312, depicted in column 302, centered about baseband, and thus frequency-offset from notch 308 by the undesired frequency offset.

In receiver 200, combiner 126 combines filtered signal 112 with restorative signal 212 to produce intermediate signal 231 substantially free of 151. That is, combiner 126 combines spectrum B (in column 304) having notch 308 with spectrum C (in column 304) including frequency-correction spectrum 310 to produce spectrum D (in column 304). Spectrum D (in column 304) thus represents the sum of spectrums B and C. In column 304, since frequency-correction spectrum 310 and notch 308 coincide-in-frequency with each other, spectrum D has a substantially flat passband and an excellent Signal-to-Noise ratio (SNR). In the time domain, the effect of the flat spectral passband is a substantially reduced or eliminated ISI in signals 231 and 232 of receiver 200. In column 304, the flat spectral passband of spectrum D illustrates a near perfect match between filter 106 and DFE 150 as used in restorative signal generator 210. In contrast, in receiver 100, signal 124 has corrupted spectrum D (in column 302) that causes a significantly degraded SNR and substantial 151.

In receiver 200, multiplier 120 frequency-shifts intermediate signal 231 to baseband responsive to frequency correctional signal 122, thereby producing baseband signal 232 substantially free of 151 and the undesired frequency offset. Signal 232 has spectrum E in column 304. Spectrum E in column 304 has a substantially flat passband, equating to minimal ISI. In contrast, in receiver 100, signal 132 has corrupted spectrum E in column 302.

Figure 4:
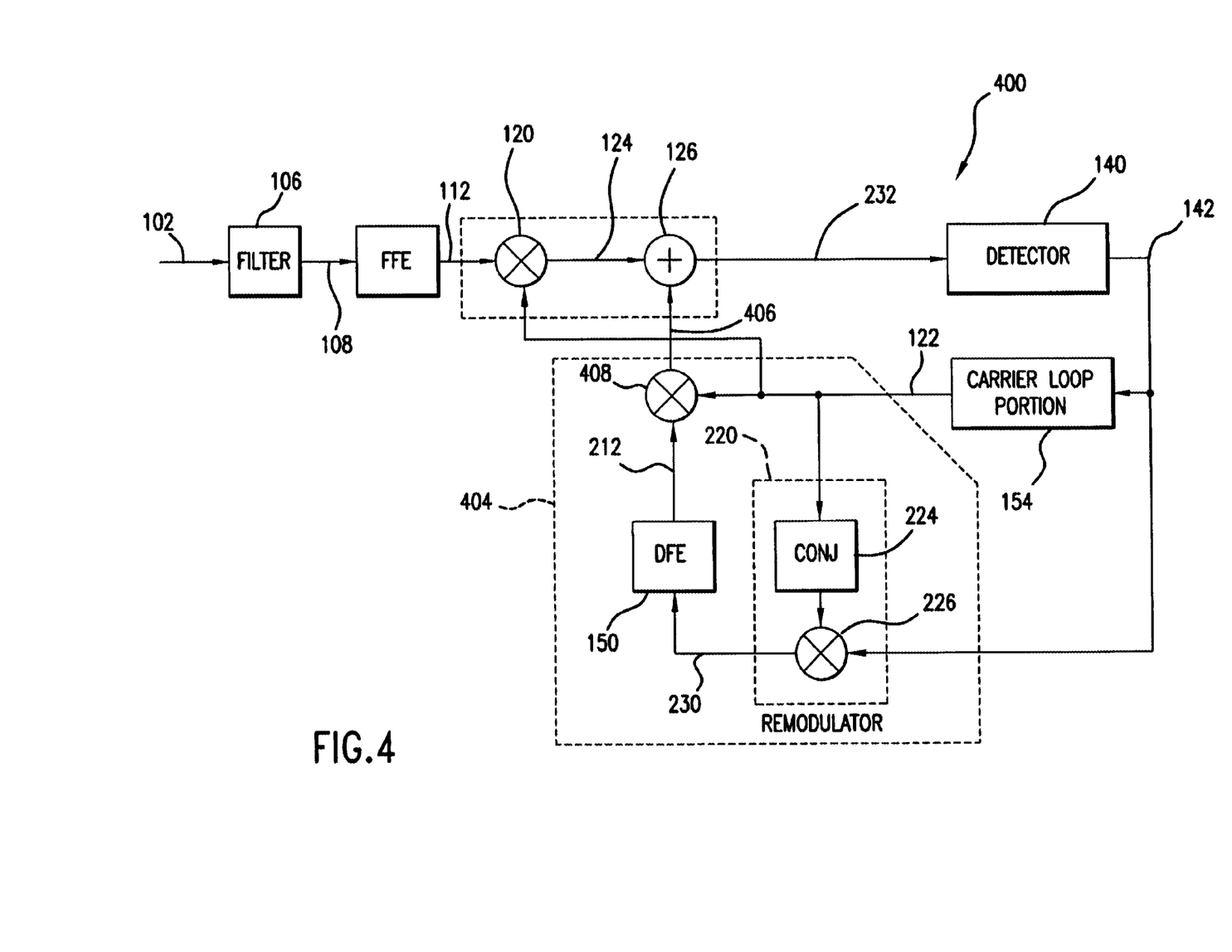
FIG. 4 is a block diagram of another example receiver having improvements over the receiver of FIG. 1.

FIG. 4 is a block diagram of another example receiver 400 having improvements over receiver 100. Receiver 400 includes a restorative signal generator 404 for generating, from decision signal 142, a restorative signal 406 based on frequency correction signal 122 (and thus, based on frequency-offset estimate ω). Restorative signal generator 404 includes remodulator 220 coupled to DFE 150, similar to the arrangement of restorative signal generator 210 of receiver 200 (discussed above in connection with FIG. 2). However, restorative signal generator 404 also includes a second multiplier 408 following DFE 150. Multiplier 408 frequency-shifts frequency-shifted restorative signal 212 toward baseband responsive to frequency correction signal 122 (and thus, based on frequency-offset estimate ω), thereby producing restorative signal 406. In other words, multiplier 408 frequency-shifts frequency-shifted restorative signal 212 toward baseband by an amount equal to frequency-offset estimate ω.

In receiver 400, multiplier 120 precedes combiner 126. In receiver 400, combiner 124 combines intermediate signal 124 with restorative signal 406 to produce baseband signal 232 substantially free of ISI and the undesired frequency offset.

Figure 5:
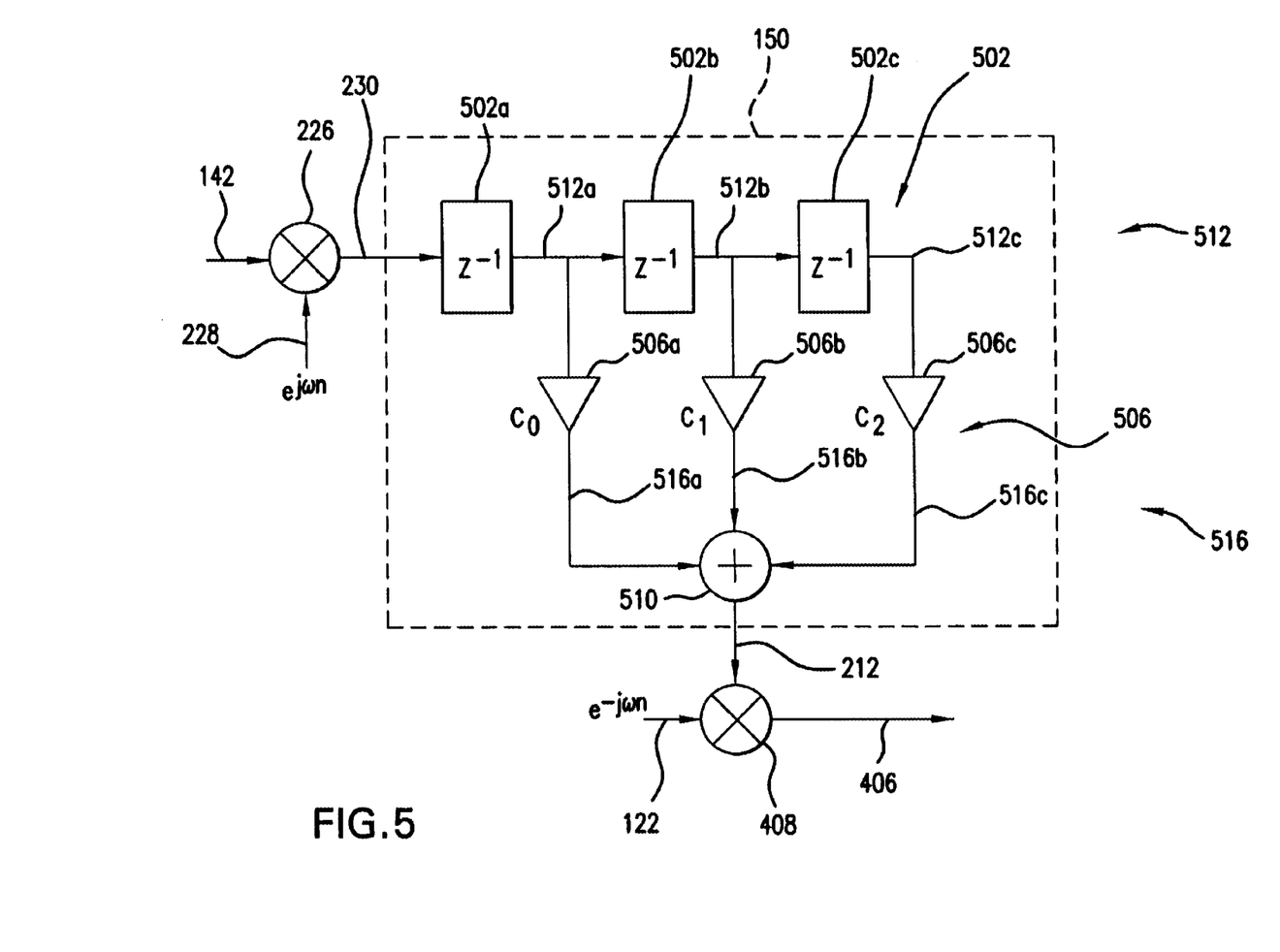
FIG. 5 is a block diagram expanding on portions of a restorative signal generator of the receiver of FIG. 4.

FIG. 5 is a block diagram expanding on portions of restorative signal generator 404 of receiver 400. Depicted in FIG. 5, are multipliers 226 and 408, and a detailed block diagram of DFE 150. DFE 150 includes a delay stage 502 including cascaded delay units 502a–502c, coupled to a weighting stage 506 including multipliers 506a–506c associated with respective weights $C_0$–$C_2$, and a combiner 510. The coefficients are also used for filtering in filter 106.

Delay stage 502 produces successive time-delayed portions 512a, 512b and 512c of frequency-shifted decision signal 230. For example, in an arrangement where signal 230 includes signal samples, time-delayed portions 512 are time-delayed samples of signal 230. Weighting stage 506 weights time-delayed portions 512a, 512b and 512c with respective coefficients $C_0$, $C_1$ and $C_2$, to produce weighted, time-delayed portions 516a, 516b and 516c. Combiner 510 combines weighted portions 516 to produce signal 212. Delay stage 502 and weighting stage 506 may include more or less unit delays and weighting units (that is, multipliers), respectively.

When receiver 200 (or 400) receives a data burst in signal 102, the carrier loop in receiver 200 acquires the frequency offset associated with signal 102. While the carrier loop acquires the frequency offset, frequency-offset estimate ω evolves over time, for example, on a sample-by-sample basis when the signals of receiver 200 include samples. An inspection of the architecture of FIG. 5 reveals that as the carrier loop acquires the frequency offset and as frequency-offset estimate ω evolves toward a settled value, the remodulation process used in restorative signal generator 404 (which includes modulating decision signal 142 with correction signal 228) can introduce some remodulation error in the taps of DFE 150 (the taps correspond to the vertical branches depicted in FIG. 5 leading off of the individual outputs of unit delays 502). The remodulation error occurs because while frequency offset ω evolves toward the settled and correct value, at any instant, there is a sequence of old erroneous frequency estimates propagating in the DFE taps. Even after the frequency-offset estimate ω settles to a correct value, it will take as many sample clocks (that shift samples through DFE 150) as there are DFE taps to "flush out" the old values in the DFE, after which time the DFE will contain correct information.

Figure 6:
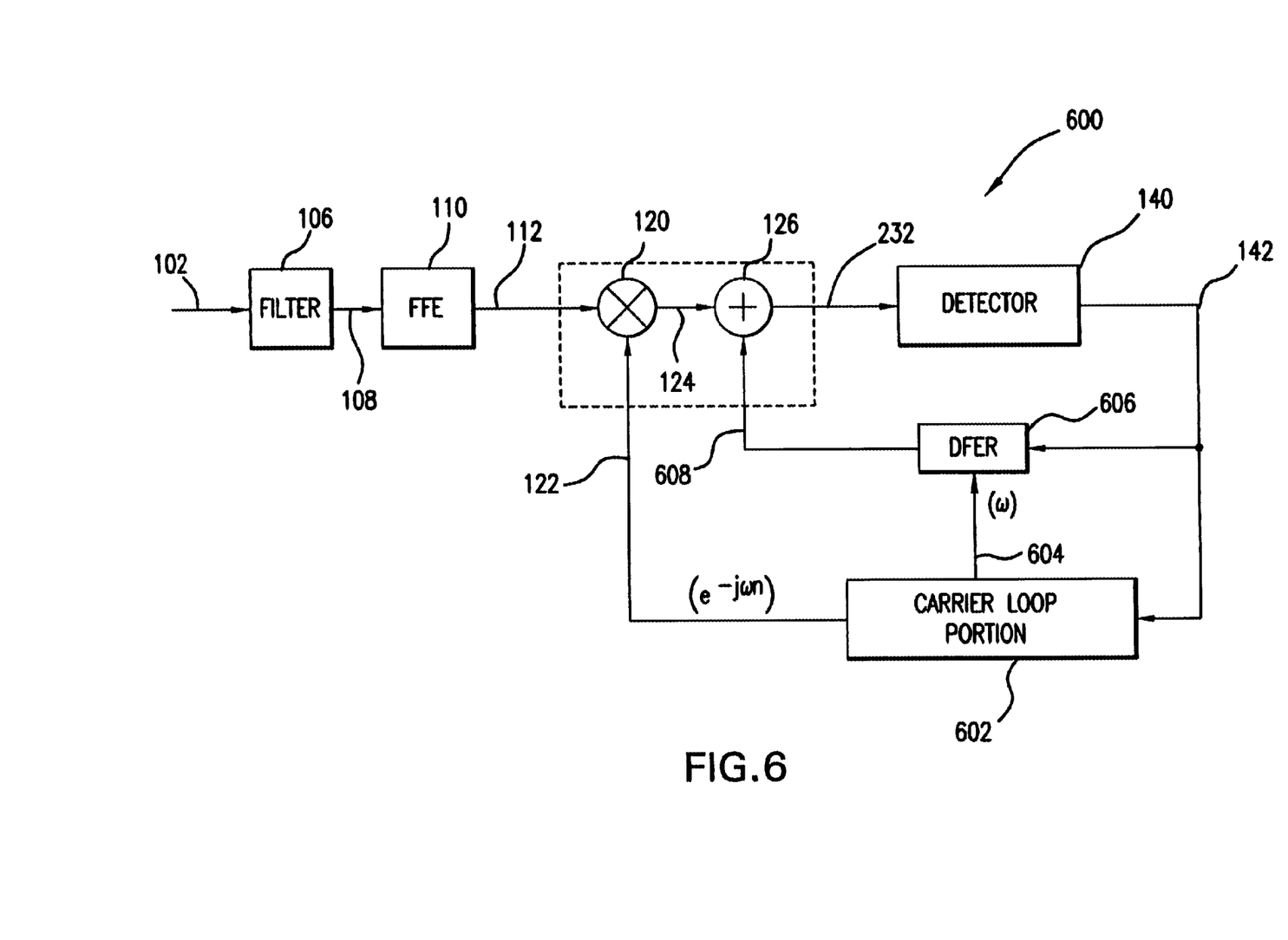
FIG. 6 is a block diagram of another example receiver having improvements over the receiver of FIG. 1.
Figure 7:
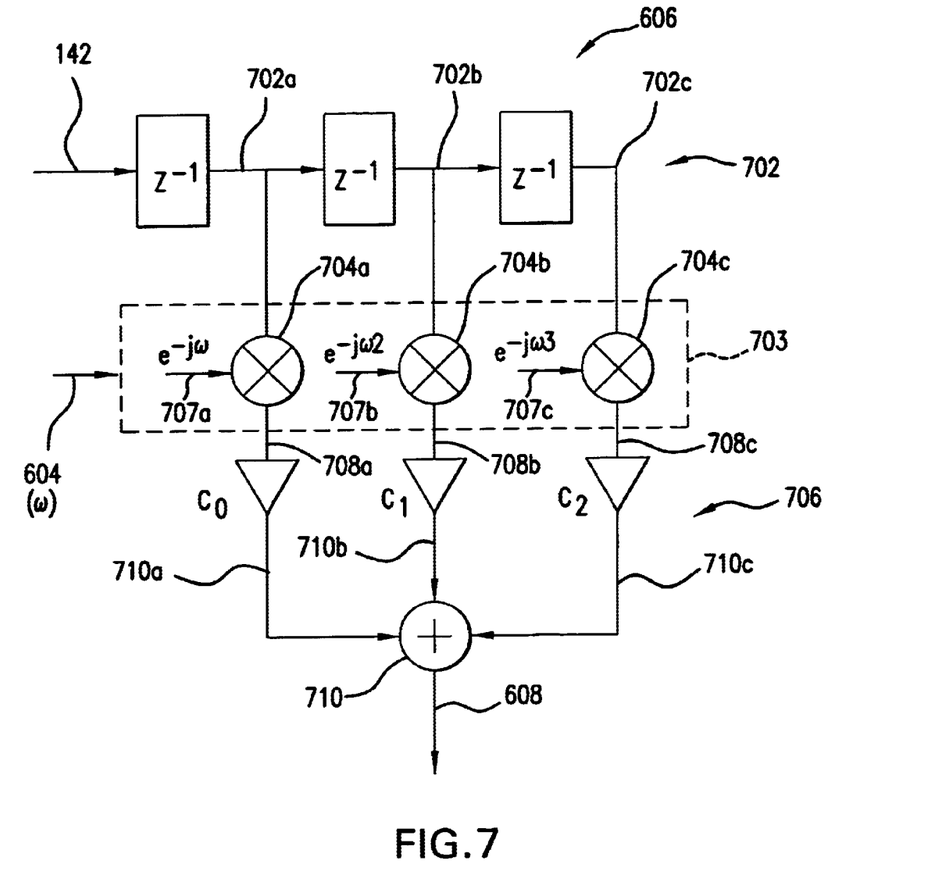
FIG. 7 is a block diagram of an example arrangement of a restorative signal generator of the receiver of FIG. 6.

FIGS. 6 and 7 are example architectures that eliminate the above described remodulation error, and thus, improve signal acquisition time. FIG. 6 is a block diagram of another example receiver 600 having improvements over receivers 100, 200 and 400. Receiver 600 includes a carrier loop portion 602 for generating, from decision signal 142, frequency correction signal 122, and frequency-offset estimate ω (also indicated at 604). Carrier loop portion 602 is the same as carrier loop portion 154, except loop portion 602 provides frequency-offset estimate 604 as an output signal. Receiver 600 includes a restorative signal generator 606 for generating, from decision signal 142, a restorative signal 608 responsive to frequency-offset estimate 604. That is, generator 606 receives frequency-offset estimate 604, and generates restorative signal 608 based on the estimate. Combiner 126 combines intermediate signal 124 with restorative signal 608 to produce baseband signal 232 substantially free of ISI and the undesired frequency offset. The improvement in acquisition time offered by receiver 600 is due at least in part to the restorative signal generator 606.

FIG. 7 is a block diagram of an example arrangement of restorative signal generator 606. Restorative signal generator 606 includes a delay stage 702, a remodulator stage 703, a weighting stage 706, and a combiner 710. Delay stage 702 receives decisional signal 142 and produces successive time-delayed portions 702 from the decision signal, as depicted in FIG. 7. Remodulator 703 includes multipliers 704, as depicted in FIG. 7. Remodulator 703 derives phase adjustments 707 from frequency-offset estimate 604, and applies the phase adjustments to respective ones of multipliers 704, as depicted in FIG. 7. Remodulator 703 phase-adjusts (that is, remodulates) each of time-delayed portions 702 with a respective one of phase adjustments 707, thereby producing phase-adjusted (or remodulated), time-delayed portions 708, as depicted in FIG. 7. This process is referred to as remodulation. Weighting stage 706 weights the phase-adjusted, time-delayed portions 708 with respective coefficients $C_0$, $C_1$ and $C_2$, to produce weighted, phase-adjusted, time-delayed portions 710. Combiner 710 combines portions 710 into restorative signal 608. Generator 606 may include more or less unit delays, remodulator multipliers, and weighting units.

In an alternative arrangement of generator 606, the order of remodulator stage 703 and weighting stage 706 is reversed. That is, weighting stage 706 precedes remodulator 703.

Restorative signal generators 404 and 606 both include remodulation. Generator 404 includes multipliers 226 and 408 before and after DFE 150, respectively. Essentially, these multipliers are distributed or recombined internal to the DFE in generator 606, to provide a more efficient implementation. Generator 606 allows changes in the value of frequency-offset estimate ω caused by the carrier loop to be relatively instantly distributed to all of the taps in generator 606 without delay. This is because remodulator 703 concurrently applies phase adjustments 707 (which are each based on frequency-offset estimate ω) to multipliers 704 as the frequency-offset estimate ω becomes available. Thus, as soon as a settled value of frequency-offset estimate ω becomes available, remodulator 703 applies this settled value to all of the taps. In doing so, the error propagation mentioned above in connection with generator 404 is avoided.

Stated otherwise, multipliers 226 and 408 of generator 404 can be merged within DFE 150 to arrive at the architecture depicted in FIG. 7. The resulting phase adjustments 707 (also referred to as remodulation factors) become "sealed" versions of frequency-offset estimate ω. Each tap in FIG. 7 is updated as soon as the carrier loop changes, thus reducing error propagation and improving acquisition speed. Generator 606 is referred to as a decisional feedback equalizer with internal remodulation (DFER).

In each of receivers 200, 400 and 600, combiner 126 and mixer 120, regardless of their order, collectively represent a converter. The converter converts filtered signal 112 to baseband signal 232 substantially free of the frequency offset present in signal 102 and the ISI, responsive to the frequency-offset estimate ω (and more specifically, frequency correction signal 122) and a restorative signal (for example, signal 212, 406 or 608) that compensates for the ISI introduced prior to the converter. The converter in each of receivers 200, 400 and 600 is depicted in dotted lines encompassing combiner 126 and mixer 120. An alternative arrangement of the above-mentioned converter converts filtered signal 112 to an intermediate target frequency, and then, to a baseband signal that is substantially free of both the frequency offset and the ISI.

Figure 8:
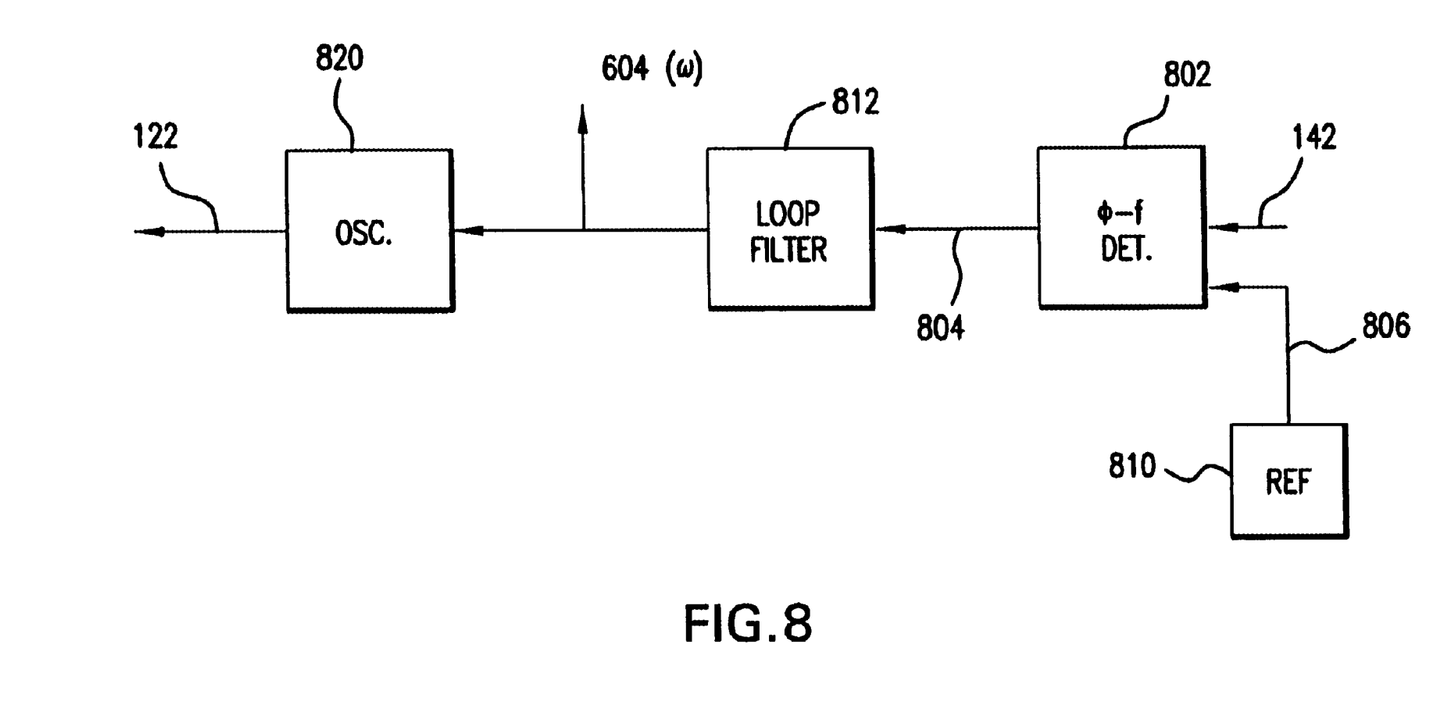
FIG. 8 is a block diagram of an example arrangement of a carrier loop portion of the receiver of FIG. 7.

FIG. 8 is a block diagram of an example arrangement of carrier loop portion 602. A phase and/or frequency detector 802 produces an error signal 804 indicative of a phase and/or frequency difference between decision signal 142 and a reference signal 806 from a reference oscillator 810. A loop filter 812 produces frequency-offset estimate 604 (ω) from error signal 804. Alternatively, a separate estimator may generate estimate 604 from error signal 804. Estimate 604 operates as a frequency control signal for a frequency tunable oscillator 820. Frequency tunable oscillator 820 produces frequency correction signal 122 responsive to frequency estimate 604.

Figure 9:
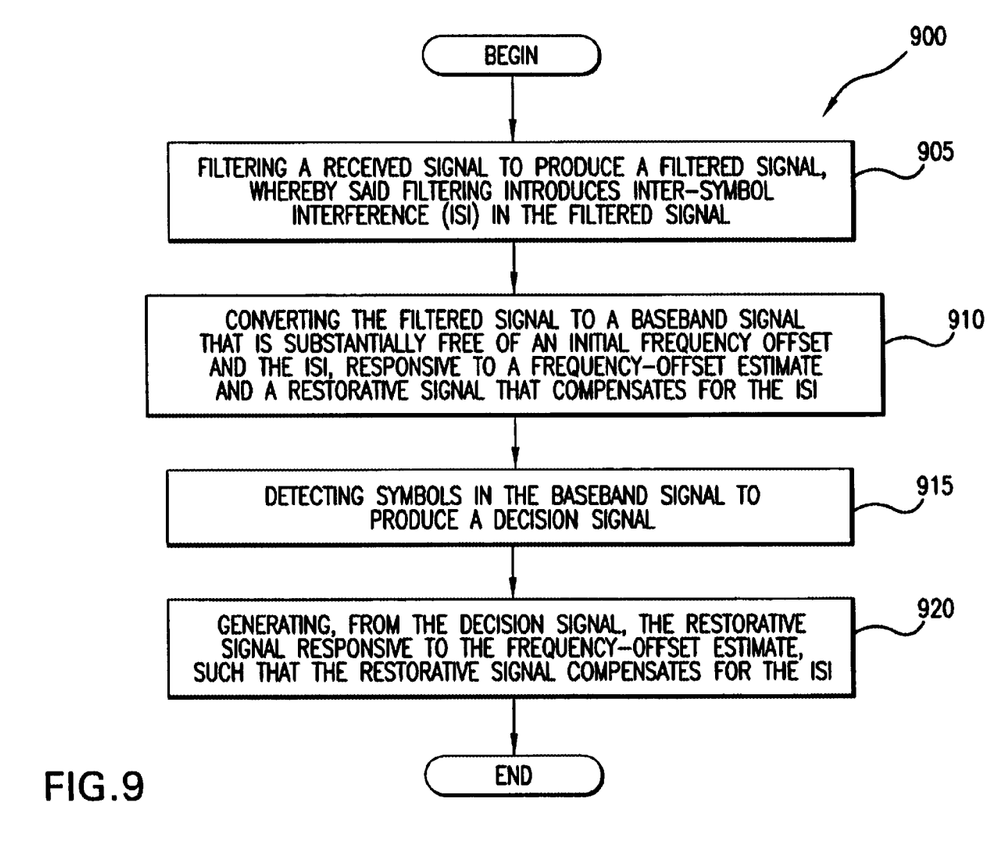
FIG. 9 is a flow chart of an example method of processing a received signal that can be implemented in a receiver of the present invention.

FIG. 9 is a flow chart of an example method 900 of processing a received signal that can be implemented in a receiver, such as receiver 200, 400, or 600 for example. It is assumed the receiver receives a received signal (for example, signal 102) including symbols and a frequency offset from baseband. It is also assumed the receiver generates an estimate of the frequency offset (for example, frequency-offset estimate ω), by way of a receiver carrier loop, for example.

A first step 905 includes filtering the received signal to produce a filtered signal, whereby the filtering introduces inter-symbol interference (ISI) in the filtered signal.

A next step 910 includes converting the filtered signal to a baseband signal that is substantially free of the frequency offset and the ISI, responsive to the frequency-offset estimate (generated by the carrier loop, for example) and a restorative signal that compensates for the ISI.

A next step 915 includes detecting the symbols in the baseband signal to produce a decision signal.

A next step 920 includes generating, from the decision signal, the restorative signal responsive to the frequency-offset estimate, such that the restorative signal compensates for the ISI.

Figure 10:
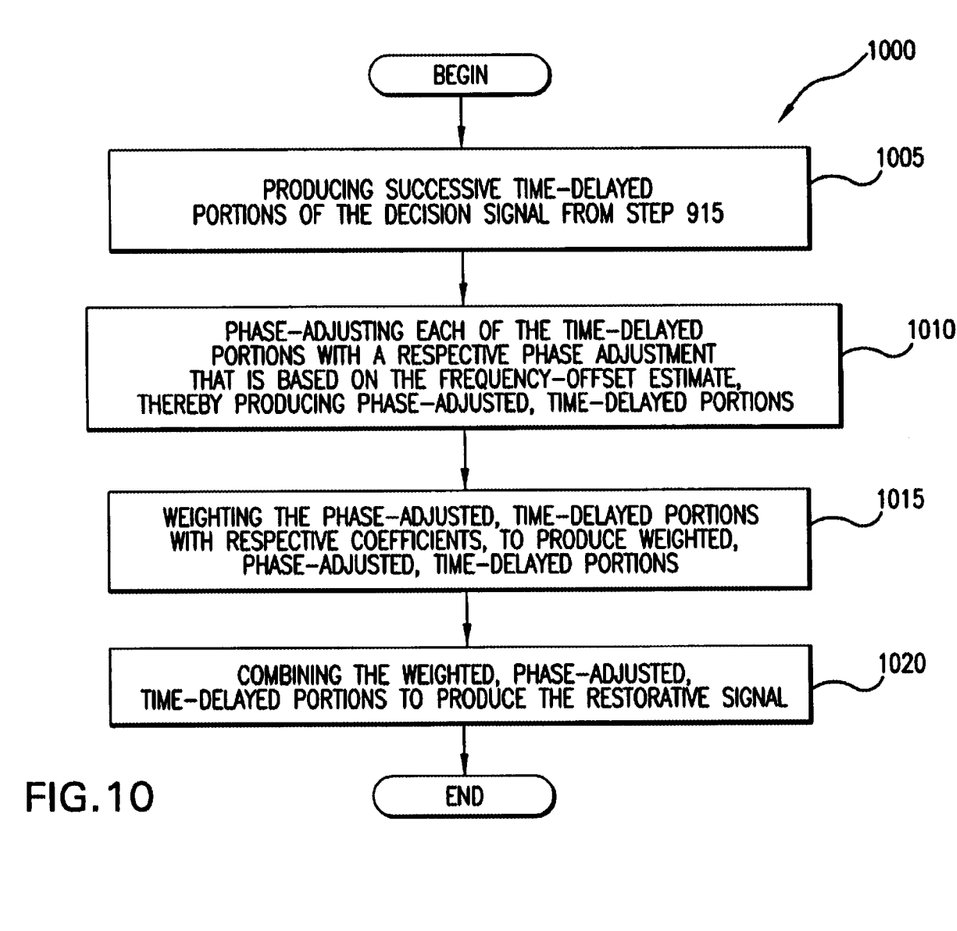
FIG. 10 is a flow chart of an example method expanding the method of FIG. 9.

FIG. 10 is a flow chart of an example method 1000 expanding on step 920. A first step 1005 includes producing successive time-delayed portions of the decision signal.

A next step 1010 includes phase-adjusting each of the time-delayed portions with a respective phase adjustment that is based on the frequency-offset estimate, thereby producing phase-adjusted, time-delayed portions.

A next step 1015 includes weighting the phase-adjusted, time-delayed portions with respective coefficients, to produce weighted, phase-adjusted, time-delayed portions.

A next step 1020 includes combining the weighted, phase-adjusted, time-delayed portions to produce the restorative signal.

In an alternative arrangement of method 1000, the order of steps 1010 and 1015 is reversed.

Exemplary arrangements of receivers 100, 200, 400 and 600 may operate on complex signals, which may be continuous-time or sampled signals. That is, some or all of the signals discussed above, such as signals 102, 108, 112, 122, 212, and soon, maybe complex signals. In such arrangements, the components of the receivers perform complex operations. For example, multipliers 120, 226, 408 and 704 perform complex multiplication operations. Other arrangements are possible, for example, wherein the receivers operate on non-complex continuous-time or discrete-time signals.

A general DFE architecture using a technique called remodulation has been presented. This architecture offers improved stability over known techniques through the decoupling of the carrier loop from the pre-filter (filter 106) and the decisional feedback equalizer (for example, DFE 150 or DFER 606). Carrier loop adaptation to frequency offsets has little or no affect on the coefficients of the DFE (or DFER), thus allowing speedier acquisition times since the carrier loop characteristically adapts faster than the DFE (or DFER). Also, an efficient implementation of the remodulation allows carrier loop changes to be distributed immediately to the DFER taps. This greatly speeds acquisition times and greatly reduces error propagation.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Also, the order of method steps may be rearranged. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. In a receiver for processing a received signal, the received signal including symbols and a frequency offset from baseband, the receiver generating an estimate of the frequency offset, a method comprising:
   (a) filtering the received signal to produce a filtered signal, whereby said filtering introduces inter-symbol interference (ISI) in the filtered signal;
   (b) converting the filtered signal to a baseband signal that is substantially free of the frequency offset and the ISI, responsive to the frequency-offset estimate and a restorative signal that compensates for the ISI;
   (c) detecting the symbols in the baseband signal to produce a decision signal; and
   (d) generating, from the decision signal, the restorative signal responsive to the frequency-offset estimate, such that the restorative signal compensates for the ISI, wherein generating the restorative signal comprises:
      (d)(i) frequency-shifting the decision signal away from baseband by an amount equal to the frequency-offset estimate to produce a frequency-shifted decision signal; and
      (d)(ii) filtering the frequency-shifted decision signal to produce the restorative signal.

2. The method of claim 1, step (b) comprises:
   (b)(i) frequency-shifting the filtered signal toward baseband by an amount equal to the frequency-offset estimate; and
   (b)(ii) reducing the ISI responsive to the restorative signal.

3. The method of claim 2, wherein step (b) further comprises one of:
   performing step (b)(i) before performing step (b)(ii); and
   performing step (b)(ii) before performing step (b)(i).

4. The method of claim 1, wherein step (b) comprises:
   (b)(i) combining the filtered signal with the restorative signal to produce an intermediate signal substantially free of the ISI; and
   (b)(ii) frequency-shifting the intermediate signal toward baseband by an amount equal to the frequency-offset estimate to produce the baseband signal.

5. The method of claim 1, wherein each of steps (a) and (d)(ii) comprise filtering based on a same set of filter coefficients.

6. The method of claim 1, wherein the received signal includes interference, and step (a) comprises filtering the received signal to reduce the interference.

7. The method of claim 1, wherein step (b) comprises:
   (b)(i) frequency-shifting the filtered signal toward baseband by an amount equal to the frequency-offset estimate to produce an intermediate signal substantially free of the frequency offset; and
   (b)(ii) combining the intermediate signal with the restorative signal to produce the baseband signal.

8. In a receiver for processing a received signal, the received signal including symbols and a frequency offset from baseband, the receiver generating an estimate of the frequency offset, a method comprising:
   (a) filtering the received signal to produce a filtered signal, whereby said filtering introduces inter-symbol interference (ISI) in the filtered signal;
   (b) converting the filtered signal to a baseband signal that is substantially free of the frequency offset and the ISI, responsive to the frequency-offset estimate and a restorative signal that compensates for the ISI;
   (c) detecting the symbols in the baseband signal to produce a decision signal; and
   (d) generating, from the decision signal, the restorative signal responsive to the frequency-offset estimate, such that the restorative signal compensates for the ISI, wherein generating the restorative signal comprises:
      (d)(i) frequency-shifting the decision signal away from baseband by an amount equal to the frequency-offset estimate to produce a frequency-shifted decision signal; and
      (d)(ii) filtering the frequency-shifted decision signal to produce a frequency-shifted restorative signal; and
      (d)(iii) frequency-shifting the frequency-shifted restorative signal toward baseband by an amount equal to the frequency-offset estimate to produce the restorative signal.

9. The method of claim 8, wherein step (b) comprises:
   (b)(i) frequency-shifting the filtered signal toward baseband by an amount equal to the frequency-offset estimate to produce an intermediate signal substantially free of the frequency offset; and
   (b)(ii) combining the intermediate signal with the restorative signal to produce the baseband signal.

10. The method of claim 8, wherein each of steps (a) and (d)(ii) comprise filtering based on a same set of filter coefficients.

11. In a receiver for processing a received signal, the received signal including symbols and a frequency offset from baseband, the receiver generating an estimate of the frequency offset, a method comprising:
   (a) filtering the received signal to produce a filtered signal, whereby said filtering introduces inter-symbol interference (ISI) in the filtered signal;
   (b) converting the filtered signal to a baseband signal that is substantially free of the frequency offset and the ISI, responsive to the frequency-offset estimate and a restorative signal that compensates for the ISI;
   (c) detecting the symbols in the baseband signal to produce a decision signal; and
   (d) generating, from the decision signal, the restorative signal responsive to the frequency-offset estimate, such that the restorative signal compensates for the ISI, wherein generating the restorative signal comprises:
      (d)(i) producing successive time-delayed portions of the decision signal;
      (d)(ii) phase-adjusting each of the time-delayed portions with a respective phase adjustment that is based on the frequency-offset estimate, thereby producing phase-adjusted, time-delayed portions;
      (d)(iii) weighting the phase-adjusted, time-delayed portions with respective coefficients to produce weighted, phase-adjusted, time-delayed portions; and
      (d)(iv) combining the weighted, phase-adjusted, time-delayed portions to produce the restorative signal.

12. The method of claim 11, wherein step (a) comprises filtering based on the coefficients of weighting step (d)(iii).

13. The method of claim 11, wherein step (d)(ii) comprises concurrently phase-adjusting the time-delayed portions with the respective phase adjustments.

14. In a receiver for processing a received signal, the received signal including symbols and a frequency offset from baseband, the receiver generating an estimate of the frequency offset, a method comprising:
   (a) filtering the received signal to produce a filtered signal, whereby said filtering introduces inter-symbol interference (ISI) in the filtered signal;
   (b) converting the filtered signal to a baseband signal that is substantially free of the frequency offset and the ISI, responsive to the frequency-offset estimate and a restorative signal that compensates for the ISI;
   (c) detecting the symbols in the baseband signal to produce a decision signal; and
   (d) generating, from the decision signal, the restorative signal responsive to the frequency-offset estimate, such that the restorative signal compensates for the ISI, wherein generating the restorative signal comprises:
      (d)(i) producing successive time-delayed portions of the decision signal;
      (d)(ii) weighting the time-delayed portions with respective coefficients to produce weighted, time-delayed portions;
      (d)(iii) phase-adjusting each of the weighted, time-delayed portions with a respective phase adjustment that is based on the frequency-offset estimate, thereby producing weighted, phase-adjusted, time-delayed portions; and
      (d)(iv) combining the weighted, phase-adjusted, time-delayed portions to produce the restorative signal.

15. The method of claim 14, wherein step (a) comprises filtering based on the coefficients of weighting step (d)(ii).

16. The method of claim 14, wherein step (d)(iii) comprises concurrently phase-adjusting the weighted, time-delayed portions with the respective phase adjustments.

17. A receiver for processing a received signal, the received signal including symbols and a frequency offset from baseband, the receiver including a carrier tracking loop for generating an estimate of the frequency offset, comprising:
   a filter for filtering the received signal to produce a filtered signal, whereby said filtering introduces inter-symbol interference (ISI) in the filtered signal;
   a converter for converting the filtered signal to a baseband signal that is substantially free of the frequency offset and the ISI, responsive to the frequency-offset estimate and a restorative signal that compensates for the ISI;
   a detector for detecting the symbols in the baseband signal to produce a decision signal; and
   a restorative signal generator for generating, from the decision signal, the restorative signal responsive to the frequency-offset estimate, such that the restorative signal compensates for the ISI, wherein the restorative signal generator comprises:
      a first multiplier for frequency-shifting the decision signal away from baseband by an amount equal to the frequency-offset estimate to produce a frequency-shifted decision signal;
      an equalizer filter for filtering the frequency-shifted decision signal to produce a frequency-shifted restorative signal; and
      a second multiplier for frequency-shifting the frequency-shifted restorative signal toward baseband by an amount equal to the frequency-offset estimate to produce the restorative signal.

18. The receiver of claim 17, wherein the converter comprises:
   a multiplier for frequency-shifting the filtered signal toward baseband by an amount equal to the frequency-offset estimate to produce an intermediate signal substantially free of the frequency offset; and
   a combiner for combining the intermediate signal with the restorative signal to produce the baseband signal.

19. The receiver of claim 17, wherein the received signal includes interference, and step (a) comprises filtering the received signal to reduce the interference.

20. The receiver of claim 17, wherein the converter comprises:
   a multiplier for frequency-shifting the filtered signal toward baseband by an amount equal to the frequency-offset estimate; to produce an intermediate signal substantially free of the frequency offset; and
   a combiner combining the intermediate signal with the restorative signal to produce the baseband signal.

21. A receiver for processing a received signal, the received signal including symbols and a frequency offset from baseband, the receiver including a carrier tracking loop for generating an estimate of the frequency offset, comprising:
   a filter for filtering the received signal to produce a filtered signal, whereby said filtering introduces inter-symbol interference (ISI) in the filtered signal;
   a converter for converting the filtered signal to a baseband signal that is substantially free of the frequency offset and the ISI, responsive to the frequency-offset estimate and a restorative signal that compensates for the ISI;

a detector for detecting the symbols in the baseband signal to produce a decision signal; and a restorative signal generator for generating, from the decision signal, the restorative signal responsive to the frequency-offset estimate, such that the restorative signal compensates for the ISI, wherein the restorative signal generator comprises:

a delay stage for producing successive time-delayed portions of the decision signal;

a phase adjustment stage for phase-adjusting each of the time-delayed portions with a respective phase adjustment that is based on the frequency-offset estimate, thereby producing phase-adjusted, time-delayed portions;

a weighting stage for weighting the phase-adjusted, time-delayed portions with respective coefficients; to produce weighted, phase-adjusted, time-delayed portions; and a combiner combining the weighted, phase-adjusted, time-delayed portions to produce the restorative signal.

22. The receiver of claim 21, wherein the filter uses the coefficients of the weighting stage as filter coefficients.

23. A receiver for processing a received signal, the received signal including symbols and a frequency offset from baseband, the receiver including a carrier tracking loop for generating an estimate of the frequency offset, comprising:

a filter for filtering the received signal to produce a filtered signal, whereby said filtering introduces inter-symbol interference (ISI) in the filtered signal;

a converter for converting the filtered signal to a baseband signal that is substantially free of the frequency offset and the ISI, responsive to the frequency-offset estimate and a restorative signal that compensates for the ISI;

a detector for detecting the symbols in the baseband signal to produce a decision signal; and a restorative signal generator for generating, from the decision signal, the restorative signal responsive to the frequency-offset estimate, such that the restorative signal compensates for the ISI, wherein the restorative signal generator comprises:

a delay stage for producing successive time-delayed portions of the decision signal;

a weighting stage for weighting the time-delayed portions with respective coefficients to produce weighted, time-delayed portions;

a phase adjustment stage for phase-adjusting each of the weighted, time-delayed portions with a respective phase adjustment that is based on the frequency-offset estimate, thereby producing weighted, phase-adjusted, time-delayed portions; and a combiner for combining the weighted, phase-adjusted, time-delayed portions to produce the restorative signal.

24. The receiver of claim 23, wherein the filter uses the coefficients of the weighting stage as filter coefficients.

25. A receiver for processing a received signal, the received signal including symbols and a frequency offset from baseband, the receiver generating an estimate of the frequency offset, a method comprising:

means for filtering the received signal to produce a filtered signal, whereby said filtering introduces inter-symbol interference (ISI) in the filtered signal;

means for converting the filtered signal to a baseband signal that is substantially free of the frequency offset and the ISI, responsive to the frequency-offset estimate and a restorative signal that compensates for the ISI;

means for detecting the symbols in the baseband signal to produce a decision signal; and means for generating, from the decision signal, the restorative signal responsive to the frequency-offset estimate, such that the restorative signal compensates for the ISI, wherein the means for generating the restorative signal comprises:

means for frequency-shifting the decision signal away from baseband by an amount equal to the frequency-offset estimate to produce a frequency-shifted decision signal; and means for filtering the frequency-shifted decision signal to produce the restorative signal.

26. The receiver of claim 25, wherein the means for converting the filtered signal comprises:

means for combining the filtered signal with the restorative signal to produce an intermediate signal substantially free of the ISI; and means for frequency-shifting the intermediate signal toward baseband by an amount equal to the frequency-offset estimate to produce the baseband signal.

27. A Decisional Feedback Equalizer (DFE) for use in a receiver that processes a received signal, the received signal including symbols and an undesired frequency offset, the receiver being configured to generate a decision signal at or near baseband representative of detected symbols, the receiver being configured to generate an estimate of the frequency offset, the receiver including a pre-filter that introduces inter-symbol interference into the received signal, comprising:

a delay stage for producing successive time-delayed portions of the decision signal;

a phase adjustment stage and a weighting stage that together produce, from the time-delayed portions, weighted, time-delayed portions based on weighting coefficients and the frequency-offset estimate; and a combiner for combining the weighted, phase-adjusted, time-delayed portions to produce a restorative signal that compensates for the inter-symbol interference.

* * * * *